United States Patent
Fillep et al.

(10) Patent No.: US 11,980,126 B2
(45) Date of Patent: May 14, 2024

(54) AGRICULTURAL APPARATUS COMPRISING SPEED SENSORS AND CONTROLS

(71) Applicant: AGCO International GmbH, Neuhausen (CH)

(72) Inventors: Johannes Fillep, Feucht (DE); Ronnie Kinast, Ilschwang (DE)

(73) Assignee: AGCO International GmbH, Neuhausen (CH)

( * ) Notice: Subject to any disclaimer, the term of this patent is extended or adjusted under 35 U.S.C. 154(b) by 539 days.

(21) Appl. No.: 17/199,394

(22) Filed: Mar. 11, 2021

(65) Prior Publication Data

US 2021/0282321 A1  Sep. 16, 2021

(30) Foreign Application Priority Data

Mar. 11, 2020 (GB) ..................... 2003488

(51) Int. Cl.
*A01D 43/08* (2006.01)
*A01D 41/127* (2006.01)

(52) U.S. Cl.
CPC ....... *A01D 43/085* (2013.01); *A01D 41/1271* (2013.01); *A01D 43/086* (2013.01)

(58) Field of Classification Search
None
See application file for complete search history.

(56) References Cited

U.S. PATENT DOCUMENTS

| | | | |
|---|---|---|---|
| 6,401,440 B1 * | 6/2002 | Franet | A01D 57/20 56/203 |
| 8,061,112 B2 * | 11/2011 | Hugenroth | A01D 41/1274 56/10.2 G |
| 8,220,233 B2 * | 7/2012 | Hironimus | A01D 75/30 180/6.2 |
| 8,688,331 B2 * | 4/2014 | Peterson | A01B 79/005 172/383 |
| 9,769,982 B2 * | 9/2017 | Figgins | A01D 41/141 |
| 10,849,272 B2 * | 12/2020 | Bertino | A01D 75/00 |

FOREIGN PATENT DOCUMENTS

| | | |
|---|---|---|
| CA | 1183355 B | 3/1985 |
| DE | 202005016401 U1 | 2/2007 |
| EP | 2055174 A1 | 5/2009 |
| EP | 2769613 B1 | 4/2017 |
| WO | 2018/011016 A1 | 1/2018 |

OTHER PUBLICATIONS

UK Intellectual Property Office, Search Report for related UK Application No. GB2003488.0, dated Sep. 3, 2020.

* cited by examiner

*Primary Examiner* — James J Lee
*Assistant Examiner* — David Hatch

(57) ABSTRACT

An agricultural apparatus including an agricultural vehicle and a number of work units suitable for cutting standing crop, including a front work unit and two lateral work units located behind and to the sides of the front work unit, each of the work units deposit cut crop as a swath. Each of the lateral work units include a conveyor to deposit cut crop. A plurality of sensors determine the speed of the agricultural apparatus and the speed of operation of each of the conveyors. A control unit receives inputs from the sensors, compares the inputs to a predetermined set of values for a desired vehicle speed and a speed of operation of the conveyors, and as indicated by the comparison, adjusts the speed of operation of at least one conveyor.

5 Claims, 3 Drawing Sheets

AGRICULTURAL APPARATUS COMPRISING SPEED SENSORS AND CONTROLS

CROSS REFERENCE TO RELATED APPLICATION

This application claims the benefit of the filing date of U.K. Application No. GB2003488.0, "Agricultural Apparatus," filed Mar. 11, 2020, which is hereby incorporated by reference in its entirety.

TECHNICAL FIELD

The present disclosure relates to an agricultural apparatus comprising an agricultural vehicle and a number of work units suitable for generating swathes of cut crop, and in particular to a mowing apparatus for cutting a standing crop such as hay.

BACKGROUND

It is known to provide a mower combination in which a first mower unit is located ahead of an agricultural vehicle such as a tractor with two further lateral mower units trailing the agricultural vehicle. The rear mower units are provided with conveyors for depositing cut crop into a swath or swathes behind the agricultural vehicle.

Typically the conveyors are operated at constant speeds. This has as a disadvantage that as the speed of the agricultural vehicle is increased, the harvesting throughput increases leading to a build-up of cut crop on the conveyors with an increasing risk that the build-up may become a blockage. When this happens, mowing must stop while an operator attends to clearing of the blockage. Particularly in a time-sensitive operation such as mowing, such stoppages are undesirable.

BRIEF SUMMARY

According to a first embodiment, an agricultural apparatus comprises an agricultural vehicle and a number of work units suitable for cutting a standing crop connected to the agricultural vehicle, including a front work unit and two lateral work units located behind and to the sides of the front work unit, each of the lateral work units being provided with conveyors to deposit the cut crop as a swath, the agricultural apparatus further comprising a control unit receiving a plurality of signals. The signals represent the speed of the agricultural apparatus and the speed of each of the conveyors. The control unit is configured to receive the plurality of signals and compare the signals for a desired vehicle speed and a speed of operation of the conveyors to a predetermined set of values and to adjust the speed of operation of at least one conveyor based on this comparison.

The speed of operation of the conveyors may be altered to accommodate varying volumes of harvested crop. The signal representing the speed of the agricultural apparatus can be provided by the agricultural vehicle, by a speed sensor, such as a radar sensor on the agricultural apparatus or by information provided by a GPS receiver. The conveyors may include conveyor belts or conveyor screws. The agricultural apparatus may also include a user terminal coupled to the control unit to provide feedback to an operator about the speed of the conveyors.

Additionally, the control unit can adjust the transverse position of the lateral units in response to the signal representing the speed of the agricultural apparatus. The user terminal can also provide feedback to an operator about the transverse position of the conveyors.

According to another embodiment, a method of operation of an agricultural apparatus comprises receiving real-time input signals corresponding to the speed of the agricultural vehicle and the speed of operation of the conveyor(s); the control unit comparing the signals for the speed of the agricultural vehicle and the speed of operation of the conveyor(s) to a predetermined set of values; and, as required, generating a signal to cause the speed of operation of the conveyor(s) to be adjusted based on the comparison.

According to another embodiment, a computer implemented method comprises a control unit receiving signals representing the speed of an agricultural vehicle and the speed of operation of the conveyor(s), the control unit comparing the received signals to a predetermined set of values and adjusting the speed of operation of the conveyor(s) when indicated by the comparison.

According to another embodiment, a computer readable storage medium comprises instructions that cause one or more processors to implement the methods described herein.

BRIEF DESCRIPTION OF THE DRAWINGS

Embodiments will now be described, by way of example only, with reference to the accompanying drawings, in which.

DETAILED DESCRIPTION

The disclosure will now be described in the following detailed description with reference to the drawings, wherein certain embodiments are described in detail. Although described with reference to these specific embodiments, it will be understood that the disclosure is not limited to these embodiments. But to the contrary, numerous alternatives, modifications, and equivalents will become apparent from consideration of the following detailed description.

Reference to terms such as longitudinal, transverse, and vertical are made with respect to a longitudinal vehicle axis, which is parallel to a normal forward direction of travel.

Figure 1:
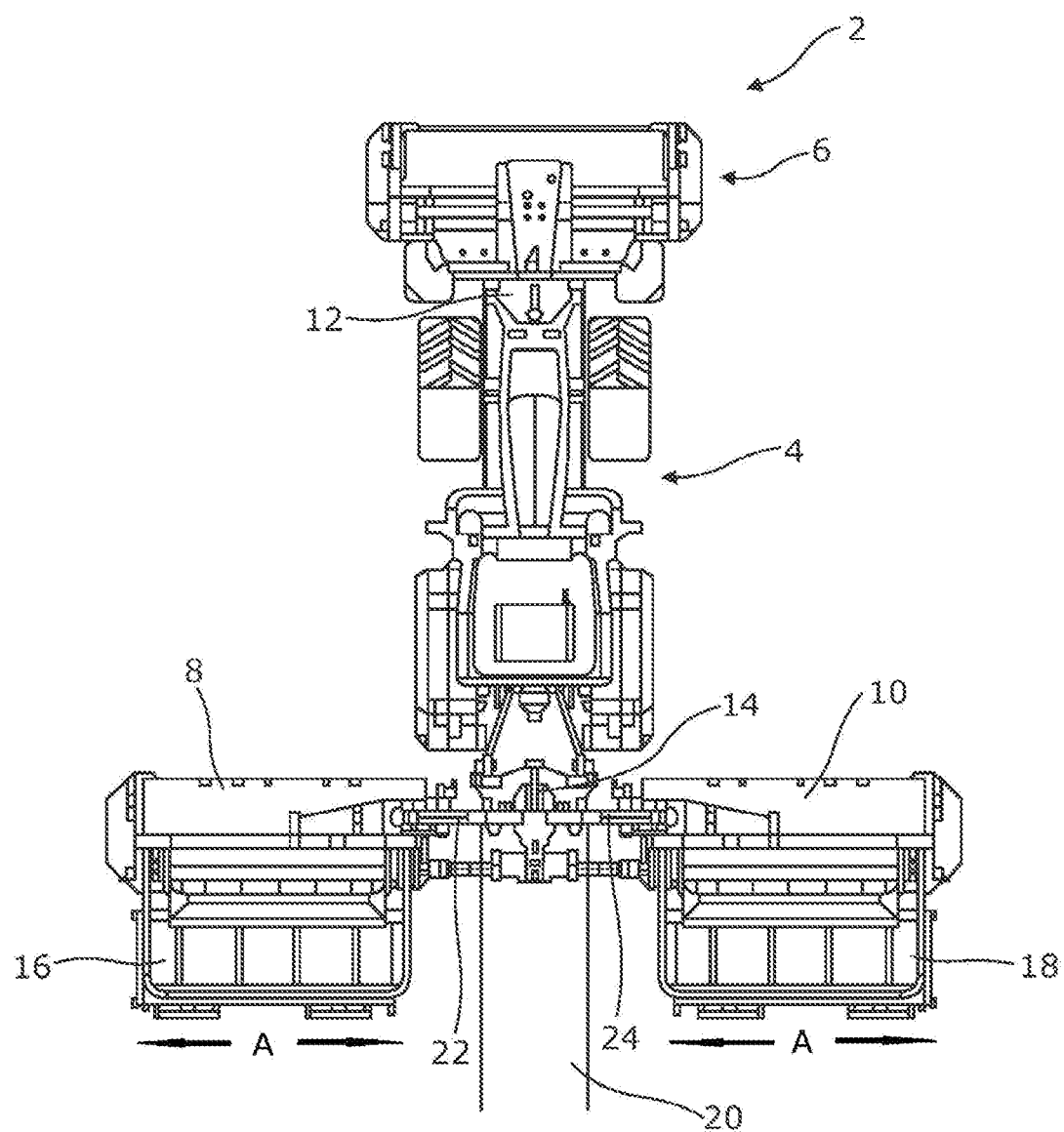
FIG. 1 shows a plan view of an agricultural apparatus.
Figure 2:
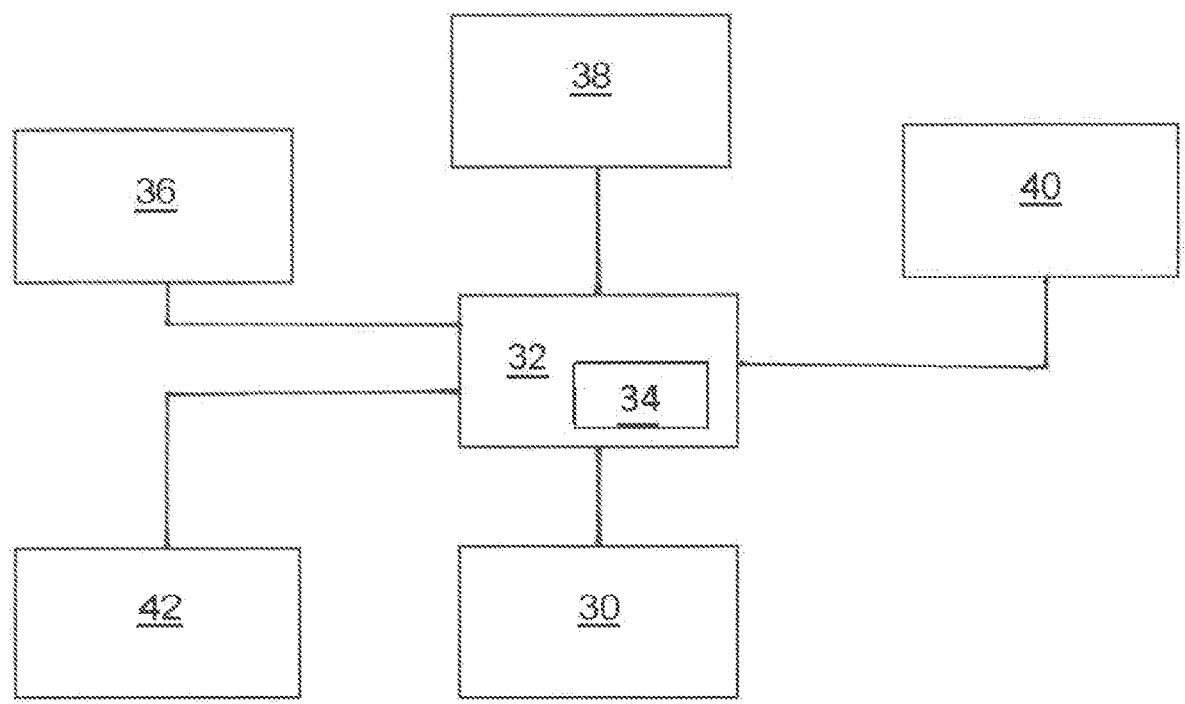
FIG. 2 shows a schematic view of elements of an agricultural apparatus.

With reference to FIG. 1, a plan view of an agricultural apparatus 2 is shown. The agricultural apparatus 2 comprises an agricultural vehicle 4 such as a tractor, and a number of work units 6, 8, 10 suitable for cutting standing crop, the work units 6, 8, 10 being connected to the agricultural vehicle 4. The work units 6, 8, 10 include a front work unit 6 located to the front of the agricultural vehicle 4 and two lateral work units 8, 10 located behind and to the sides of the front work unit 6, each of the work units 6, 8, 10 depositing cut crop as a swath. The front work unit 6 is conveniently mounted on a front hitch 12 of the agricultural vehicle 4. The two lateral work units 8, 10 are conveniently mounted on a central chassis supported from a rear hitch 14 of the agricultural vehicle 4. In some embodiments the work units 6, 8, 10 comprise mowing units.

The lateral work units 8, 10 are supported from a central chassis by hydraulic units 22, 24. Each hydraulic unit 22, 24 may be used to move a respective lateral work unit 8, 10 from a working position to a transport position. A headland position may be defined between the working position and the transport position. In the working position, the height of each of the lateral work units 8, 10 above the ground surface may be further controlled by operation of the hydraulic units 22, 24.

In FIG. 1, a swath 20 produced by the front work unit 6 is shown. In practice, conveyors 16, 18 mounted to the rear of the lateral work units 8, 10 direct cut crop material to one side or the other of the respective lateral work units 8, 10 to produce a broader central swath 20 or one or more additional swathes as desired. These additional swathes are omitted from FIG. 1 for clarity.

The conveyors 16, 18 may be driven in any suitable manner, for example by way of a hydraulic circuit served by an accumulator on the agricultural vehicle 4, or by their own pumps and reservoirs mounted on the lateral work units 8, 10.

The conveyors 16, 18 are mounted to be displaceable with respect to the lateral work units 8, 10 in a direction transverse to the direction of travel of the agricultural apparatus 2 (as indicated by arrows A in FIG. 1). The conveyors 8, 10 can comprise conveyor belts or conveyor screws.

An operator can control operation of the front and rear work units 6, 8, 10 from within the agricultural vehicle 4 by use of a suitable user terminal 30. For example, the operator can cause each of the work units 6, 8, 10 to move from a working position to a headland position, can cause the rear work units 8, 10 to move from the working position to a transport position, or can cause the conveyors 16, 18 to move from an active position to an inactive position.

The user terminal 30 communicates with an electronic control unit 32. The control unit 32 provides signals to control operation of the front and rear hitches 12, 14 of the agricultural vehicle 4 and provides signals to control operation of the work units 6, 8, 10 and the conveyors 16, 18. The signals are provided by way of a suitable data communication network such as one compliant with the ISOBUS standard (a network in conformance to the ISO 11783).

The control unit 32 may comprise a single processor located on the agricultural vehicle, or its functions may be split between a processor located on the agricultural vehicle and one or more additional processors located on the work units 6, 8, 10, the additional processor(s) being in electronic communication with the first processor.

The control unit 32 is also able to access a suitable memory 34. The memory 34 may take any suitable form and is in electronic communication with the control unit 32. The memory 34 is adapted to store, in any suitable manner such as a database or look-up table, values for the vehicle speed with respective target values for the speed of operation of the conveyors 16, 18.

The agricultural apparatus 2 further comprises a plurality of sensors adapted to provide input signals to the control unit 32. An input signal representing the forward speed of the agricultural apparatus 2 can be provided by a suitable sensor 36. Examples of such sensors include a sensor incorporated within an electronic control system of the agricultural vehicle 4, and a speed sensor provided on the agricultural apparatus 2. Alternatively, the input signal may be provided by a GPS receiver via a network interface 42 connected to the control unit 32. The network interface 42 can comprise hardware and/or software that enables wireless connection to one or more remotely located computing devices over a network (e.g., a wireless or mixed wireless and wired network). For instance, the network interface 42 may cooperate with browser software or other software of the control unit 30 to communicate with a server device, enabling remote monitoring or control of the agricultural apparatus 2.

Input signals representative of the speed of operation of the conveyors 16, 18 may be provided by speed sensors 38 located on the agricultural apparatus 2, for example within the conveyors 16, 18. Sensors 40 mounted on the agricultural apparatus 2, for example on the conveyors 16, 18, can provide input signals representative of the transverse displacement of the conveyors 16, 18.

The control unit 32 is configured to receive the input signals representing the speed of the agricultural apparatus 2 and the speed of operation of the conveyors 16, 18 and to compare the input signals with reference values for a desired vehicle speed and speed of operation of the conveyors 16, 18 and, as required, adjust the speed of operation of the conveyors 16, 18 based on this comparison.

Figure 3:
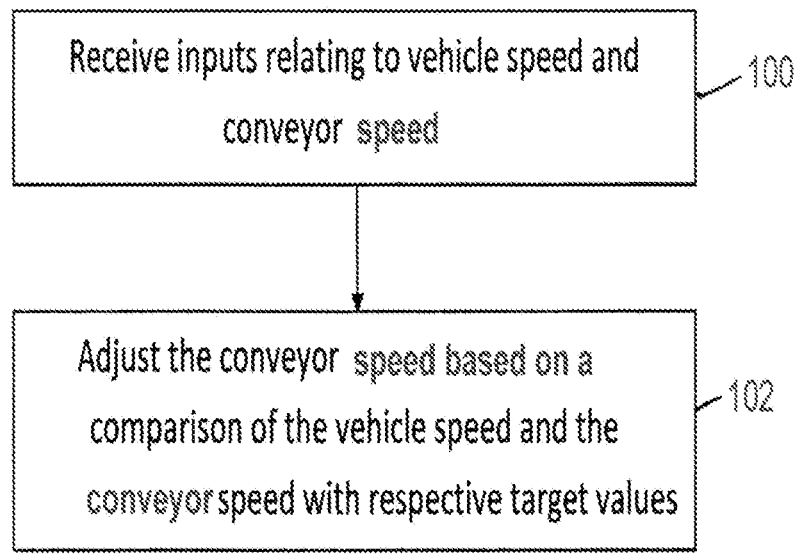
FIG. 3 shows a flow diagram illustrating an example control method.

For example, as the speed of the agricultural apparatus 2 increases, the control unit 32 detects the increase in the vehicle speed signal (act 100 in FIG. 3) and based on a comparison of the input signals with the reference or target values stored in the memory 34, the control unit 32 causes the speed of operation of the conveyors 16, 18 to be adjusted (act 102). This has as an advantage that blockage of the conveyors 16, 18 can be avoided.

Figure 4:
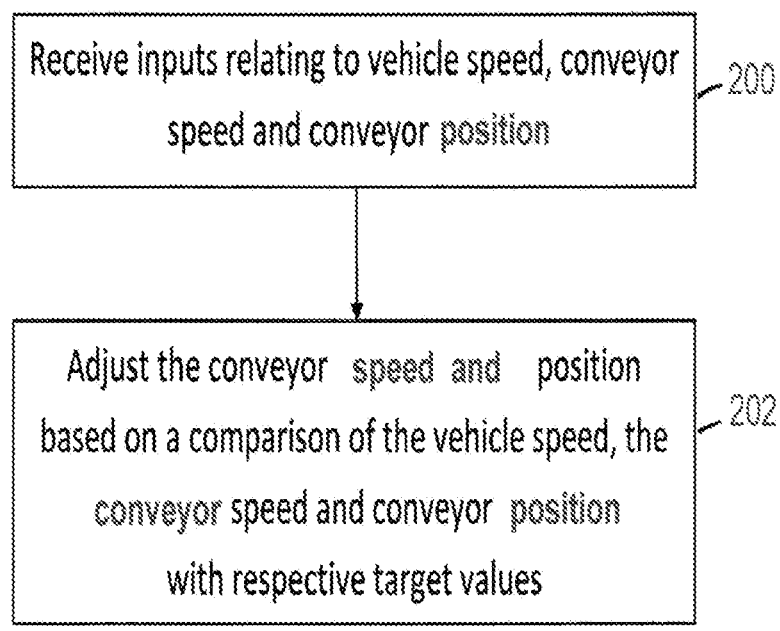
FIG. 4 shows a flow diagram illustrating an additional example control method.

The control unit 32 may be configured to receive the input signals representing the transverse displacement of the conveyors 16, 18. The control unit 34 receives the input signals representing the speed of the agricultural apparatus 2, the speed of operation of the conveyors 16, 18 and a transverse displacement of the conveyor 16, 18 (act 200 in FIG. 4), and based on a comparison of the input signals with the reference or target values stored in the memory 34, the control unit 32 causes the speed of operation of the conveyor(s) 16, 18 and the transverse displacement of the conveyor(s) 16, 18 to be altered (act 202). In this case, the memory 34 is adapted to store, in any suitable manner such as a database or look-up table, values for the vehicle speed with respective target values for the speed of operation of the conveyors 16, 18 and the transverse displacement of the conveyors 16, 18.

In other embodiments, the control unit 32 may receive input from the user terminal 30, as entered by the operator. For instance, the operator may prompt a display of the parameters (the speed of the agricultural apparatus 2, the speed of operation of the conveyors 16, 18, the transverse displacement of the conveyors 16, 18), where the control unit 32 provides the corresponding information for rendering on a display screen in the agricultural vehicle 4 or remotely, or otherwise provided to an operator in other forms (e.g., audibly). In some embodiments, the control unit 32 may provide feedback of any automatic adjustment in the speed of the conveyors 16, 18 or the transverse position of the conveyors 16, 18 to the operator via the user terminal 30.

In this way, despite changing the speed of the conveyor(s) 16, 18 in response to the speed of the agricultural apparatus, a constant swath width is produced. This is beneficial for the further processing of the cut crop by a subsequent vehicle.

Still other embodiments involve a computer-readable storage medium (e.g., a non-transitory computer-readable storage medium) having processor-executable instructions configured to implement one or more of the techniques presented herein. Many such computer-readable media may be devised by those of ordinary skill in the art that are configured to operate in accordance with one or more of the techniques presented herein.

From reading the present disclosure, other modifications will be apparent to persons skilled in the art. Such modifications may involve other features which are already known in the field of mowers and component parts therefore and which may be used instead of or in addition to features already described herein.

The invention claimed is:

1. An agricultural apparatus comprising:
   an agricultural vehicle;
   a plurality of work units suitable for cutting standing crop, the plurality of work units comprising:
      a front work unit; and
      two lateral work units located behind and to the sides of the front work unit, each of the lateral work units comprising a respective conveyor configured to deposit cut crop as a swath; and
   a control unit comprising:
      at least one processor; and
      at least one non-transitory computer-readable storage medium storing instructions thereon that, when executed by the at least one processor, cause the control unit to:
         receive operation data representing a current speed of the agricultural apparatus, a current speed of each of the conveyors, and a current transverse displacement of each conveyor of the two lateral work units;
         based at least partially on the received operation data, adjust a transverse position of at least one conveyor relative to a respective lateral work unit of the two lateral work units; and
         based at least partially on the received operation data, adjust a speed of operation of at least one conveyors of the two lateral work units.

2. The agricultural apparatus of claim 1, wherein the control unit further comprises instructions that, when executed by the at least one processor, cause the control unit to receive the operation data from at least one source selected from the group consisting of the agricultural vehicle, a speed sensor on the agricultural apparatus, and a GPS receiver.

3. The agricultural apparatus of claim 1, wherein each the conveyors comprises at least one of conveyor belts or conveyor screws.

4. A method of operating an agricultural apparatus, the method comprising:
   receiving operation data representing a current speed of the agricultural apparatus, a current speed of each conveyor of two lateral work units, and a current transverse displacement of each conveyor of the two lateral work units
   based at least partially on the received operation data, adjusting a transverse position of at least one conveyor relative to a respective lateral work unit of the two lateral work units; and
   based at least partially on the received operation data, adjusting a speed of operation of the at least one conveyor of the two lateral work units.

5. A computer implemented method comprising:
   a control unit comprising:
      at least one processor; and
      at least one non-transitory computer-readable storage medium storing instructions thereon that, when executed by the at least one processor, cause the control unit to:
         receive operation data representing a current speed of an agricultural apparatus, a current speed of each conveyor of two lateral work units, and a current transverse displacement of each conveyor of the two lateral work units;
         based at least partially on the received operation data, adjust a transverse position of at least one conveyor relative to a respective lateral work unit of the two lateral work units; and
         adjust a speed of operation of at least one conveyor of the two lateral work units.

* * * * *